United States Patent [19]

Cocca

[11] Patent Number: 5,363,157
[45] Date of Patent: Nov. 8, 1994

[54] CAMERA UTILIZING VARIABLE AUDIO FILM FRAME FOR OPTICAL ENCODING OF AUDIO INFORMATION

[75] Inventor: J. David Cocca, New York, N.Y.

[73] Assignee: Eastman Kodak Company, Rochester, N.Y.

[21] Appl. No.: 110,280

[22] Filed: Aug. 19, 1993

[51] Int. Cl.$^5$ ............................................. G03B 29/00
[52] U.S. Cl. .......................................... 354;76; 352/27; 355/41; 369/96
[58] Field of Search .................... 354/21, 75, 76, 105, 354/106, 289.12; 352/26, 27, 28, 29, 30; 355/41; 369/92, 96, 97; 358/310, 311, 341, 342, 214; 360/14.1, 14.2, 14.3

[56] References Cited

U.S. PATENT DOCUMENTS

| 2,925,753 | 2/1960 | Schwartz et al. | 352/29 X |
| 3,046,836 | 7/1962 | Schwartz et al. | 352/27 X |
| 3,230,824 | 1/1966 | Schwartz et al. | 353/120 |
| 3,379,095 | 4/1968 | Kaprelian | 353/120 |
| 3,435,156 | 3/1969 | Schwartz et al. | 369/97 |
| 4,600,280 | 7/1986 | Clark | 352/27 X |
| 4,945,373 | 7/1990 | Hashimoto | 354/289.12 X |
| 4,983,996 | 1/1991 | Kinoshita | 354/76 |

FOREIGN PATENT DOCUMENTS 2-297535 12/1990 Japan .

Primary Examiner—Howard B. Blankenship
Attorney, Agent, or Firm—Francis H. Boos, Jr.

[57] ABSTRACT

A camera system is disclosed that optically records audio information on a photographic film containing corresponding image information. The camera system includes a user interface coupled to a camera control processor, a recording circuit coupled to the camera control processor and a microphone, an optical encoding circuit having an input coupled to the output of the recording circuit and an output coupled to an optical write head, a shutter mechanism, and a transport mechanism for advancing film past the shutter mechanism and the optical write head. In operation, the camera control processor, in response to command signals received from the user interface, controls the operation of the recording circuit, the optical encoding circuit, the optical write head, the shutter mechanism and the transport mechanism, to record audio segments of variable duration and to encode the audio segments as audio film frames of variable lengths adjacent to corresponding picture film frames when the transport mechanism advances film past the optical write head.

7 Claims, 5 Drawing Sheets

CAMERA UTILIZING VARIABLE AUDIO FILM FRAME FOR OPTICAL ENCODING OF AUDIO INFORMATION

FIELD OF THE INVENTION

The invention relates in general to methods and apparatus for optically recording audio information on photographic film. More specifically, the invention relates to photographic still cameras that record audio information in an audio film frame adjacent to a corresponding picture film frame, wherein the length of each audio film frame is varied based on the amount of audio information to be recorded.

BACKGROUND OF THE INVENTION

Image information systems have recently been introduced in which photographic film images are scanned and stored in digital form on optical compact storage discs (CD's) for subsequent reproduction and display. The optical storage discs can be utilized to store audio information as well as image information. It is therefore desirable to provide a system in which audio information corresponding to the photographic film image is recorded when the photographic image is exposed, so that the photographic film image and the recorded audio information can subsequently be stored together on the storage disc.

One approach to recording audio information related to a photographic image would be to provide a camera with a sound recording system that records the audio information on an audio storage medium. The sound storage medium could take the form of a magnetic tape, a magnetic information storage disc, or a semiconductor memory that can be detached from the camera and sent with a film roll to a processing facility. The processing facility would then develop the film image, scan the film image to create digitized image data, and store the digitized image data on the storage disc. The audio information contained on the sound storage medium corresponding to the film roll would also be recorded onto the storage disc.

There are a number of problems associated with the use of a separate audio recording medium to record the audio information as described above. The complexity and expense of the photographic camera system, for example, increases due to the requirement of providing a separate audio recording medium within the camera structure. The audio recording medium can also become separated from the photographic film at several different points in the overall process, thereby requiring that a tracking system be employed to insure that the audio recording medium and photographic film are properly mated prior to recording the image and audio information on the storage disc.

In view of the difficulties associated with the use of a separate recording medium, it is an objective of the invention to provide a camera system that records the audio information directly on the photographic film used to record the image, thereby overcoming the problem of having the audio information becoming separated from the corresponding image information during processing operations. It is a further objective of the invention to provide a camera system that optically records the audio information on the photographic film in a manner that optimizes the number of images that can be captured on the film.

SUMMARY OF THE INVENTION

The invention provides a camera system that optically records audio information on a photographic film containing corresponding image information. The audio information is recorded on an audio film frame portion of the photographic film adjacent to the corresponding picture film frame. The length of the audio film frame is varied based on the amount of audio information to be recorded, in order to optimize the number of photographs that can be recorded on the film.

The camera system includes a user interface coupled to a camera control processor, a recording circuit coupled to the camera control processor and a microphone, an optical encoding circuit having an input coupled to the output of the recording circuit and an output coupled to an optical write head, a shutter mechanism, and transport mechanism for advancing film past the shutter mechanism and the optical write head. In operation, the camera control processor, in response to command signals received from the user interface, controls the operation of the recording circuit, the optical encoding circuit, the optical write head, the shutter mechanism and the transport mechanism, to expose a plurality of picture film frames, record audio segments of variable duration corresponding to the picture film frames, and encode the audio segments as audio film frames of variable lengths adjacent to corresponding picture film frames when the transport mechanism advances film past the optical write head.

A playback circuit and speaker are also preferably included in the camera system. The camera control processor, in response to a command signal received from the user interface, controls the operation of the playback circuit to playback the recorded audio segments on the speaker. The operator can therefore review the acceptability of the audio segments prior to having the audio segments encoded.

BRIEF DESCRIPTION OF THE DRAWINGS

With the above as background, reference should now be made to the following detailed description of the preferred embodiment of the invention and the accompanying drawings, wherein.

DETAILED DESCRIPTION OF THE PREFERRED EMBODIMENT

Figure 1:
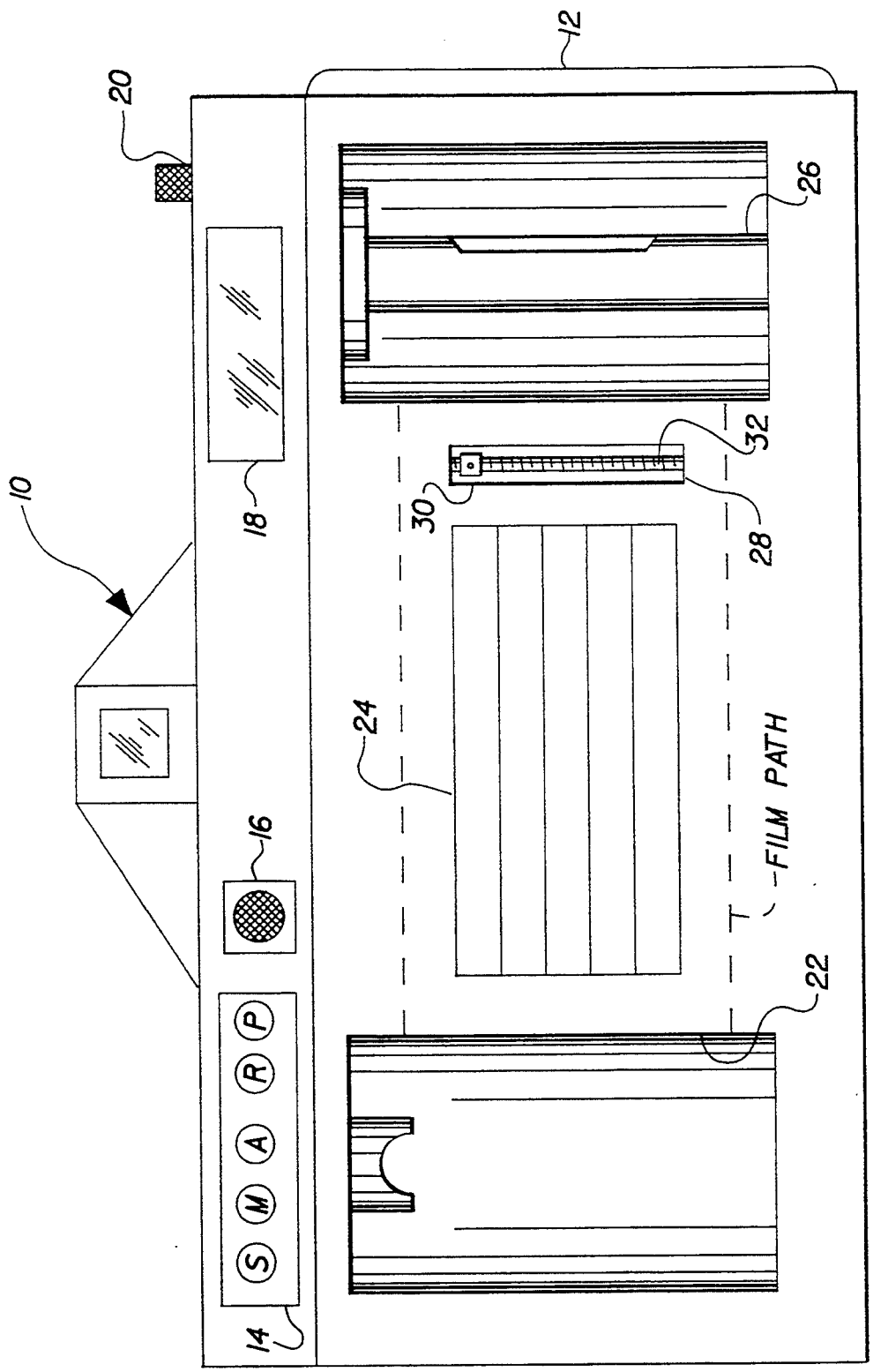
FIG. 1 is an illustration of a back side of a camera incorporating the invention.

A back view of a single lens reflex type camera incorporating the invention is illustrated in FIG. 1. For purposes of illustrating the invention, the camera 10 is shown without its back cover plate which would normally cover a lower portion 12 thereof. The camera 10 includes a user interface 14 having a plurality of control buttons and/or switches to permit an operator to enter various commands into a camera control processor (not shown), a speaker 16 for replaying recorded audio information, as will be described in greater detail below, a liquid crystal display (LCD) 18 for displaying various information concerning the operation of the camera, and a microphone 20 for recording audio information. The camera 10 further includes a conventional film cartridge storage slot 22, a shutter mechanism 24, and a film take-up spool 26 (either manual or motorized) which is used to wind film from a film cartridge along the camera's film path after each exposure. In addition, a slot 28 containing an optical write head 30 is preferably located between the shutter mechanism 24 and the film take-up spool 26 in the film path. The optical write head 30 is attached to a lead screw 32 which is driven by an optics unit motor (not shown in FIG. 1), thereby permitting the optical write head 30 to move back and forth within the slot 28.

Figure 2:
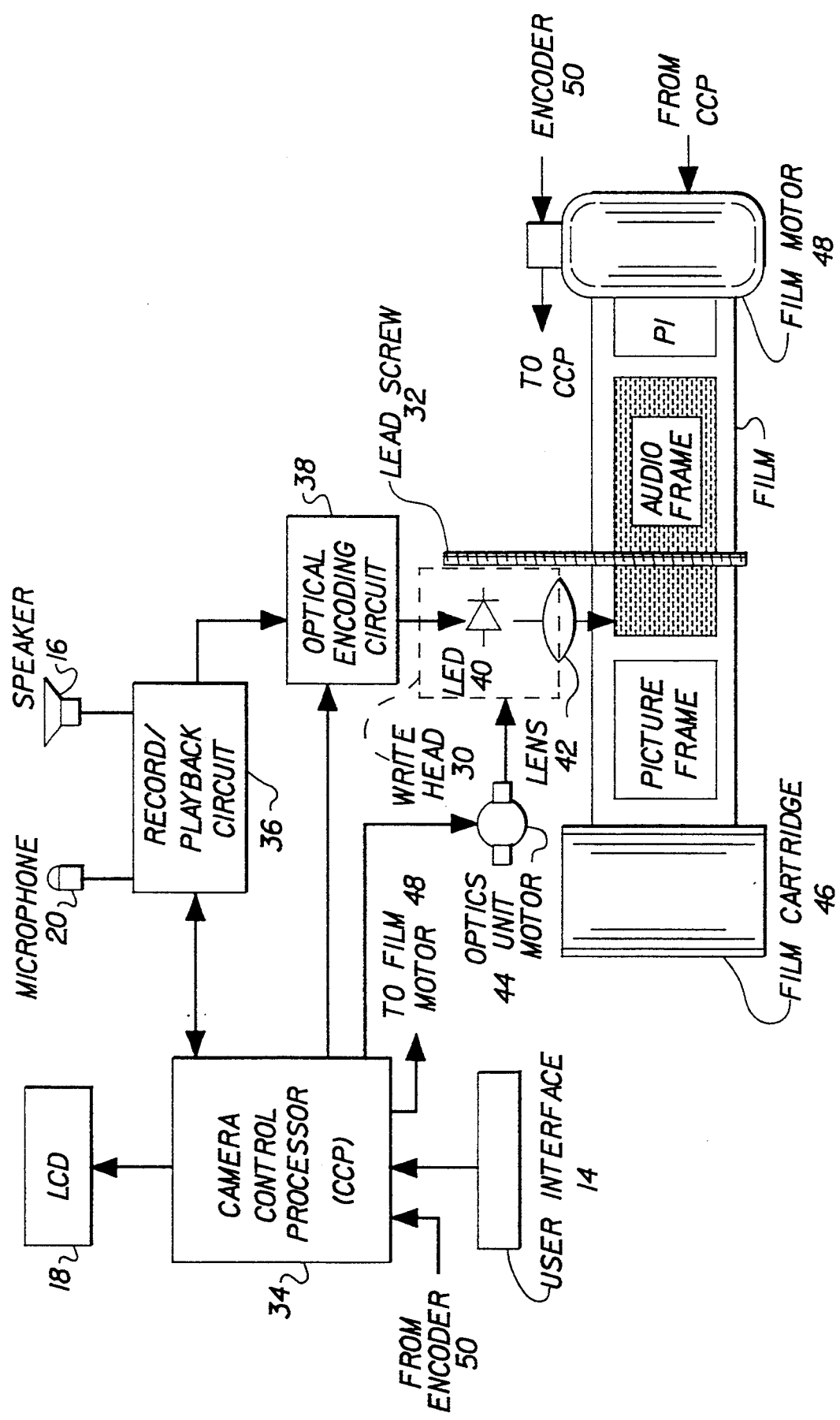
FIG. 2 is a schematic block diagram of the electronics system for the camera illustrated in FIG. 1.

An electrical schematic diagram of the camera 10 is illustrated in FIG. 2. As was mentioned above, the user interface 14 and LCD 18 are coupled to the camera control processor 34, which controls the overall operation of the camera 10 in accordance with commands entered by the operator via the user interface 14. The microphone 20 and the speaker 16 are coupled to a record/playback circuit 36, which is controlled by the camera control processor 34 and has an output coupled to an optical encoding circuit 38. The record/playback circuit 36 includes a preamplifier, automatic gain control, filters, power output amplifiers and a nonvolatile analog memory. The analog memory preferably has sufficient capacity to store a segment of audio information having a duration of fifteen seconds. The output of the optical encoding circuit 38 is coupled to the optical write head 30 which includes an LED 40 and a lens assembly 42. The optical encoding circuit 38 varies the current supplied to the LED 40 in proportion to the output of the record/playback circuit 36. The camera control processor 34 also controls the current passing through the LED 40 based on the ISO film speed of the film to be exposed in the film path. As a result, the write head 30 causes exposure variations to be recorded on film which are proportional to the originally recorded audio.

In operation, the camera 10 is loaded with film by placing a film cartridge 46 into the film cartridge storage slot 22 and threading the film take-up spool 26 in a conventional manner. In the illustrated embodiment, the film take-up spool 26 is preferably driven by transport mechanism utilizing a film motor 48 under control of the camera control processor 34, such that the film is automatically threaded and advanced to a first picture frame position when the camera back is closed. Although not shown, the camera 10 preferably includes decoding circuitry to decode a DX code contained on the film cartridge, which is indicative of the film speed and number of exposures for the film contained in the cartridge. This information is supplied to the camera control processor 34.

The user enters a command via the user interface to initiate an audio recording mode of operation. The camera control processor 34, in response to the command entered via the user interface, activates the record/playback circuit 36 to record and store an audio segment in the memory contained within the record/playback circuit 36. It should be noted that the actual recording of the audio segment by the record/playback circuit 36 can take place either before, after or during the exposure of the first picture frame P1 of the film as will be described in greater detail below. The camera control processor 34 activates the film motor 48 to begin winding the film to the next picture frame location once the first picture frame P1 has been exposed. The camera control processor 34 receives signals from an encoder 50, which is coupled to the shaft of the film motor or provided within the film path of the camera, that are indicative of the actual amount of travel of the film, and —knowing the length of a picture frame which is preset in memory—determines when the first picture frame P1 has passed over the slot 28 containing the optical write head 30. Alternatively, the camera control processor 34 can command the film motor 48 to operate for a given time based on the known length of the picture frame and the transport speed of the motor. In either case, the camera control processor 34 activates the optical encoding circuit 38 and the optics unit motor 44 to optically encode the audio segment stored in the record/playback circuit 36 onto a first audio frame A1 on the film once the first picture frame P1 has passed over the slot 28. The length of the audio frame A1 can vary based on the length of the audio segment. Thus, the film motor 48 continues to operate until the record/playback circuit 36 sends a signal to the camera control processor 34 indicating that the audio segment has been completely encoded. The camera control processor 34 then commands the film motor 48 to stop, leaving the film positioned so that a second picture frame P2 can be exposed. The above process is repeated to record an audio segment for the second picture frame P2.

As was stated above, the audio segment to be recorded for each picture frame can be of varied length and is captured either before, during or after the corresponding picture frame is exposed using different control modes. For example, in a manual mode of operation, the operator selects a manual mode button (M) on the user interface 14 that causes the camera control processor 34 to initiate recording for as long as the manual mode button is depressed (up to the maximum capacity of the memory contained in the record/playback circuit 36). The manual mode button can be used to record an audio segment prior to exposure of the corresponding picture frame or after exposure of the corresponding picture frame. To initiate an automatic mode of operation, the operator selects an automatic mode button (A) on the user interface 14 which causes the camera control processor 34 to display a message on the LCD 18 asking the operator to select the length of the recording segment. For example, the camera control processor 34 first displays the phrase "SELECT TIME" on the LCD 18 and subsequently displays the number of seconds to be selected in descending order ("15 SECS" . . . "14 SECS" . . . "13 SECS") until the operator activates the automatic mode button a second time to stop the countdown. The camera control processor 34 then activates the record/playback circuit 36 to record an audio segment of the selected duration when the shutter button (S) is activated to expose a picture film frame.

Figure 3:
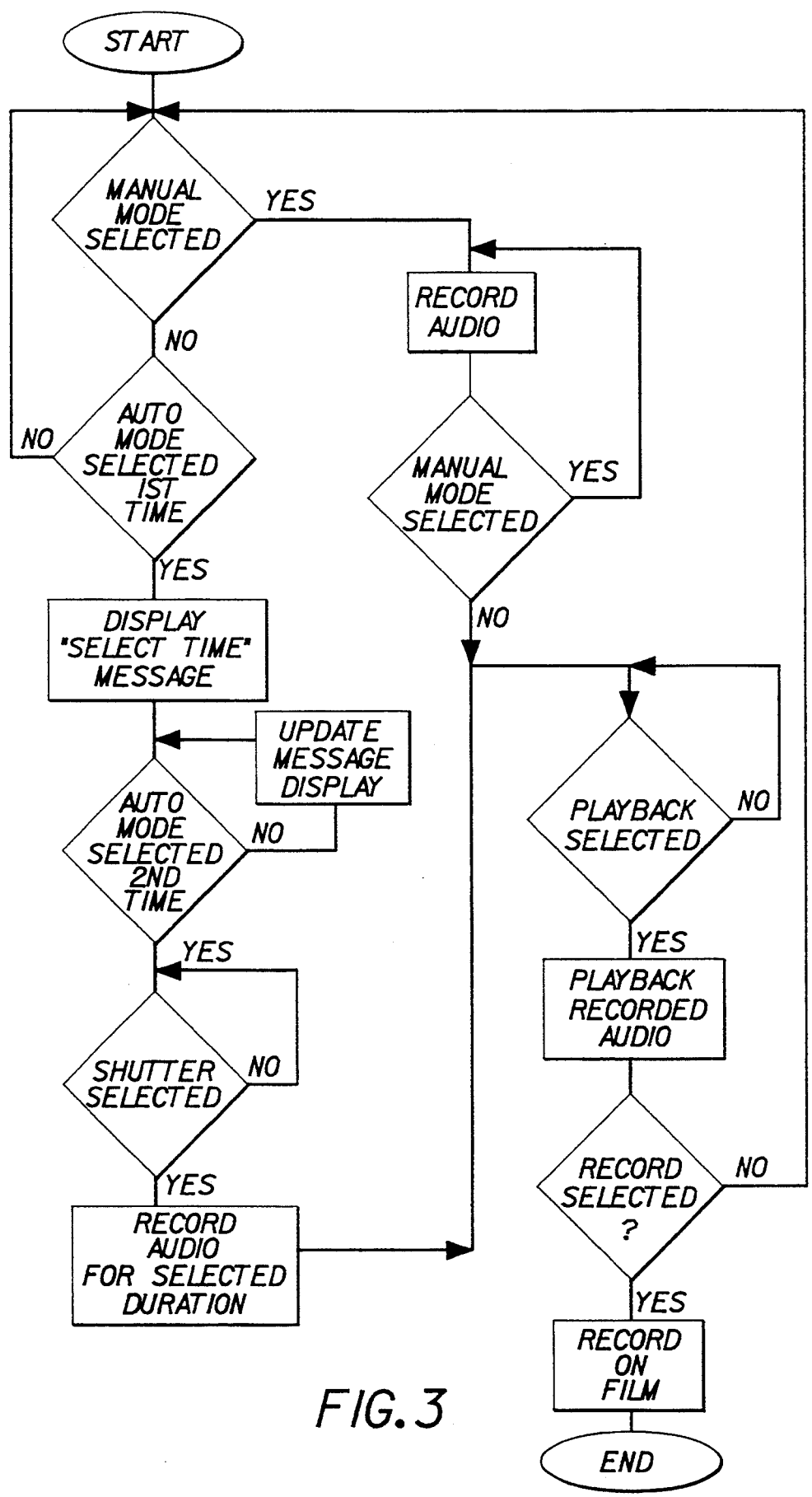
FIG. 3 is a flow diagram of the operation of the electronics system illustrated in FIG. 2.

The operator has the opportunity of reviewing the recorded audio segment prior to encoding of the film by activating a playback button (P) on the user interface 14. Upon activation of the playback button, the camera control processor 34 controls the operation of the record/playback circuit 36 to playback the recorded audio segment from memory. If the audio segment does not meet with the approval of the operator, the manual operation mode can be selected to record a new audio segment. If the audio segment is satisfactory, the operator selects a record button (R) on the user interface 14 to command the camera control processor 34 to caused the film to be advanced and the audio segment to be encoded on the film as described above. Alternatively, the record button can be eliminated and the camera control processor 34 can be programmed to advance the film and record the audio segment automatically if the audio segment is not rerecorded within a preset time period. In such a case, it can be assumed that the audio segment was acceptable and the necessity of having the operator initiate film advancement is eliminated. A flow diagram of the general operation of the above described modes is provided in FIG. 3.

Finally, it should be noted that an insufficient amount of film may remain to expose an additional picture film frame or record an audio segment after the last picture film frame is exposed. It is therefore desirable to have the camera control processor 34 maintain a record of the amount of film that has been used based on the number of exposed picture frames and the length of each of audio segments recorded on the film. The encoder 50 can be employed on the film motor 48 to provide the camera control processor 34 with signals indicative of the actual amount of film travel. Alternatively, the camera control processor 34 can multiply the number of exposures by the known length of a picture frame, calculate the amount of film used by the audio frames, based on the length of time used to record each audio segment and a known ratio of the amount of film required to encode a given audio segment (for example 5 millimeters of film/second of encoding), and add the results of the two operations to determine the total amount of film used. In either case, the camera control processor 34 subtracts the determined film travel from the known length of the film and determines whether the remaining space is sufficient to expose another picture film frame or encode a full audio segment. If a full audio segment cannot be recorded, the camera control processor 34 displays a message on the LCD 18 to inform the operator that an audio segment cannot be recorded for the last exposure or that the audio segment must be limited to a certain length in order to fit on the remaining film.

Figure 4:
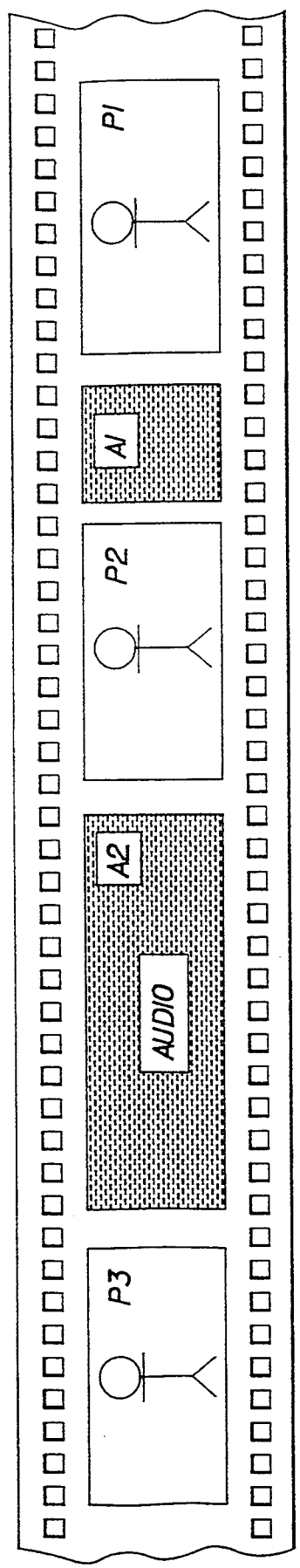
FIG. 4 illustrates a film segment having variable length audio frames recorded thereon.

The variable nature of the audio frames insures that the maximum number of exposures can be taken on the film. For example, the memory employed in the record/playback circuit 36 can preferably store a fifteen second audio segment. In many cases, however, the operator may wish to use only five or ten second seconds to narrate a particular image. In such cases, a great deal of film space would be wasted if the audio frame length were fixed to record the desired fifteen second maximum for each image. In contrast, the invention insures that the audio frame length will be limited to the minimum amount of space required, thereby permitting additional images and audio segments to be recorded. FIG. 4 illustrates the variable length of the audio frames.

Figure 5:
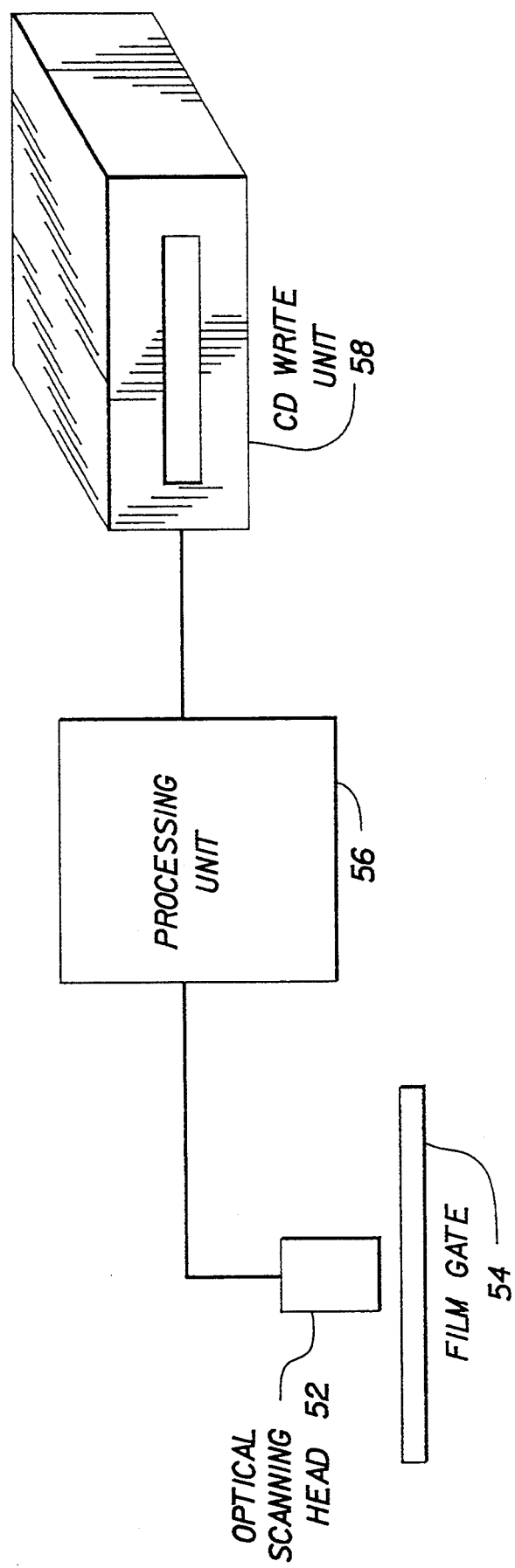
FIG. 5 illustrates a scanning system for scanning the film segment illustrated in FIG. 3.

Each audio frame is preferably identified by a start code and stop code so that a scanning unit can identify the beginning and end of the audio frame. FIG. 5, for example, illustrates a scanning unit having an optical scanning head 52 that scans film placed in a film gate 54. The film can be transported through the gate either manually or through the use of an automatic transport mechanism (not shown). The output from the optical scanning head 52 is supplied to a processing unit 56 which converts the signal from the scanning head 52 into a digital signal. The scanning head 52 is used to scan both the picture and audio frames contained on the film. The processing unit 56 identifies the audio frames based on the start and/or stop codes contained therein, and supplies the digital signal representative of a picture frame and its corresponding audio frame to a CD write unit 58 which writes the digital signal on a CD.

The invention has been described with reference to certain preferred embodiments thereof. It will be understood, however, that modifications and variations are possible within the scope of the appended claims. For example, the write head 30 can alternatively be located between the film cartridge storage slot 22 and the shutter mechanism 24. The write head 30 can also take the form of a linear array of LED's that span the width of the audio frame or a scanning beam can be employed instead of a movable write head. The playback feature can also be eliminated to further reduce the expense and complexity of the camera. In such a case, the microphone 16 would be eliminated and the record/playback circuit 36 would be replaced by a similar record only circuit. Other modes of operation can also be employed. For example, a timer mode can be utilized wherein the audio recording is started a preset time before the shutter is initiated by a timing mechanism and continues until a preset time after the shutter has been activated. It is not necessary that an audio film frame be provided for each of the picture film frames, but instead, the operator can select when an audio film frame is to be recorded. The invention can also be utilized in camera structures other than the illustrated single lens reflex camera.

Parts List

10 Camera
12 Lower Camera Portion
14 User Interface
16 Speaker
18 Liquid Crystal Display (LCD)
20 Microphone
22 Film Cartridge Storage Slot
24 Shutter Mechanism
26 Film Take-Up Spool
28 Slot
30 Write Head
32 Lead Screw
34 Camera Control Processor
36 Record/Playback Circuit
38 Optical Encoding Circuit
40 LED
42 Lens Assembly
46 Film Cartridge
48 Film Motor
50 Encoder
52 Optical Scanning Head
54 Film Gate
56 Processing Unit
58 CD Write Unit

What is claimed is:

1. A camera comprising: a user interface coupled to a camera control processor; a recording circuit coupled to the camera control processor and a microphone; an optical encoding circuit having an input coupled to the output of the recording circuit and an output coupled to an optical write head; a shutter mechanism; and transport means for advancing film past the shutter mechanism and the optical write head; wherein the camera control processor, in response to command signals received from the user interface, controls the operation of the recording circuit, the optical encoding circuit, the optical write head, the shutter mechanism and the transport mechanism, to expose a plurality of picture film frames, record audio segments of variable duration corresponding to at least one of the film frames, and encode each of the recorded audio segments as audio film frames of variable lengths at a position intermediate to a corresponding picture frame and a picture frame subsequent to the corresponding picture frame as the transport means advances film past the optical write head.

2. A camera as claimed in claim 1, further comprising a playback circuit coupled to a speaker, wherein said camera control processor, in response to a command signal received from the user interface, controls the operation of the playback circuit to playback the recorded audio segments on the speaker.

3. A camera as claimed in claim 1, further comprising a display unit, and wherein the camera control processor tracks the total amount of film used after the encoding of each audio segment and displays a message on a display unit indicative of whether additional audio segments can be encoded.

4. A camera as claimed in claim 1, wherein the optical write head is located between the shutter mechanism and the transport means along a film path of the camera.

5. A camera system comprising: means for selecting the duration of an audio segment to be recorded; means for recording the audio segment for the selected duration; means for exposing a photosensitive film to an image to form a picture frame; means for optically encoding the audio segment as an audio film frame at a location intermediate to a corresponding picture frame and a picture frame subsequent to the corresponding picture frame on the photosensitive film.

6. A camera system as claimed in claim 5, further comprising means for audibly reproducing the recorded audio segment.

7. A photosensitive film comprising: a plurality of picture film frames and a plurality of corresponding optically encoded audio film frames; wherein the audio film frames have variable lengths and are each located intermediate their corresponding picture film frames and a picture film frame subsequent thereto.

* * * * *